Jan. 23, 1968  H. E. SNEDEKER  3,365,236
WHEEL ATTACHMENT ARRANGEMENT
Filed Oct. 18, 1965

INVENTOR
H. E. SNEDEKER
BY
*H. E. Snedeker*
ATTORNEY

United States Patent Office 3,365,236
Patented Jan. 23, 1968

3,365,236
WHEEL ATTACHMENT ARRANGEMENT
Herbert E. Snedeker, Savannah, Ga. (233 Micanopy
Court, Indian Harbour Beach, Fla. 32935)
Filed Oct. 18, 1965, Ser. No. 496,847
2 Claims. (Cl. 301—9)

ABSTRACT OF THE DISCLOSURE

A wheel mounted on lugs of a hub and axle assembly is secured to the hub by a lug disk engaging the heads of the lugs in keyhole-shaped apertures and by a centrally-located bolt threaded in the lug disk which is rotated to provide a wedge between the lug disk and the wheel. Lug head detents in the lug disk prevent disengagement of the lug disk from the lugs when the bolt is rotated to provide the wedge between the lug disk and the wheel.

---

This invention relates to wheel attachment arrangements and, more particularly, to arrangements for demountably attaching wheels to hub and axle assemblies of vehicles. It has for a general object thereof the provision of a simple, practical and dependable arrangement for quickly mounting and demounting vehicle wheels.

Wheel attachment arrangements in general use today for demountably attaching wheels to vehicle hub and axle assemblies are principally of two types. The more commonly used type of wheel attachment arrangement, often referred to as "bolt-on," employs the use of a plurality of lug bolts or threaded studs secured to the hub. A corresponding plurality of holes in the wheel engage the lug bolts for mounting the wheel to the hub, the wheel being attached to the hub by lug nuts which are screwed down individually on each of the lug bolts against the wheel.

This type of wheel attachment arrangement has the advantages of simplicity and dependability, and it is relatively simple and economical to manufacture. However, a considerable amount of time and effort is required in mounting and demounting a wheel using the bolt-on arrangement since a plurality of nuts, typically four or five, must be manipulated individually. Moreover, each of the nuts must be removed completely from the lug bolts during wheel mounting and demounting, thereby presenting the disadvantage of possible misplacement of one or more of the nuts. Further, during mounting and demounting a wheel, the threaded lug bolts may be damaged from contact with the wheel, rendering replacement of the lug nuts on the bolts difficult or impossible.

The second type of wheel attachment arrangement principally in use today, often referred to as "knock-off," employs the use of a single threaded bolt secured to the center of the hub. The wheel is mounted on the bolt and attached to the hub by a locking nut which is screwed onto the bolt and against the wheel. The wheel is restrained from rotational movement relative to the hub by splines or keys on the bolt which engage splines or keyways in the wheel mounting hole, or by studs secured to the hub which engage holes in the wheel.

The knock-off type of wheel attachment arrangement permits quick mounting and demounting of the wheel since only a single nut need be manipulated. It does, however, tend to be considerably more expensive and more difficult to manufacture than the bolt-on wheel attachment arrangement. If splines or keyways are employed to prevent relative rotational movement between the wheel and the hub, care must be taken during wheel mounting and demounting to keep the splines or keyways free of foreign matter and to prevent damage thereto. Further, special wheels, and often special hubs, are required for known knock-off wheel attachment arrangements, the more commonly available and inexpensive bolt-on wheels and hubs being generally unsuitable for use in knock-off arrangements.

It is, therefore, an object of this invention to provide a simple, practical and dependable arrangement for minimizing the time and labor involved in demountably attaching wheels to vehicles.

Another object of this invention is to provide a simple and economical wheel attachment arrangement for quickly mounting and demounting wheels without the manipulation and removal of a plurality of nuts.

A further object of this invention is to provide a simple and economical arrangement for readily and quickly attaching demountable wheels to vehicles, which arrangement permits utilization of existing wheels and hubs of the bolt-on type with little or no modification.

Yet another object of this invention is to provide a demountable wheel attachment arrangement which incorporates the advantages of both the bolt-on and the knock-off type arrangements while eliminating many of their disadvantages.

In accordance with a feature of the present invention these and other objects are attained in a wheel attachment arrangement employing a two-piece attachment assembly comprising a lug disk and a disk bolt. The wheel hub to which the wheel is to be attached may be substantially identical to that presently employed in bolt-on wheel attachment arrangements, except that the threaded lug bolts secured to the hub are replaced advantageously by non-threaded lugs or studs. The wheel may be advantageously of the inexpensive and readily available bolt-on type, the plurality of lug holes in the wheel engaging the lugs for mounting the wheel on the hub and for preventing unwanted rotational movement of the wheel relative to the hub. The wheel is securably attached to the hub through the use of the attachment assembly, the lug disk thereof having a plurality of apertures for engaging the respective lugs. The disk bolt is in threaded engagement with a centrally located aperture in the lug disk, and is rotatable relative to the disk and the wheel for securing the wheel to the hub.

It is a feature of my invention that a wheel attachment arrangement comprises a lug disk having a plurality of apertures disposed therein for selectively engaging respective wheel lugs in such manner as to limit axial movement of the lug disk away from the hub assembly. In an illustrative embodiment of the invention, the lug disk apertures are keyhole shaped, the larger portion thereof permitting pasasge of a lug therethrough for mounting the lug disk on the wheel lugs. The smaller portion of each aperture, upon a slight rotation of the disk relative to the hub, engages the head of a respective lug which limits axial movement of the disk away from the hub.

Rotation of the disk bolt, preferably in the same direction relative to the hub as the disk is rotated to engage the lug heads in the smaller porions of the lug disk apertures, moves the disk bolt axially toward the hub to secure the wheel to the hub. The axial movement of the disk bolt urges the wheel firmly against the hub, movement of the disk away from the wheel and hub being restrained by the lug heads engaging the lug disk apertures. It is accordingly another feature of my invention that a wheel attachment arrangement comprises locking apparatus including a single threaded wedge for readily and securely attaching a wheel to a hub and axle assembly.

A further feature of my invention relates to individual detents in the smaler portion of each of the lug disk apertures for preventing rotation of the lug disk relative to the hub when the disk is secured thereto by operation of the locking apparatus.

The above and other objects and features of the present invention may be fully apprehended from the following detailed description when considered in conjunction with the accompanying drawing, in which.

Figure 1:
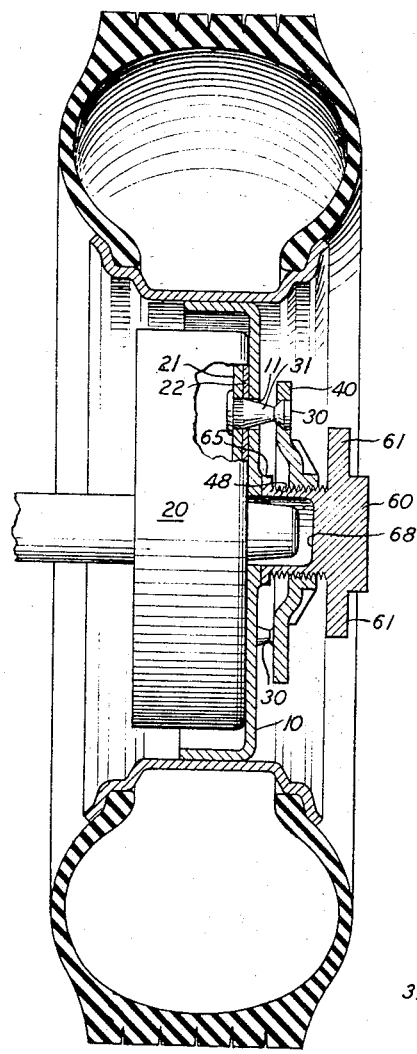
FIG. 1 is a sectional elevation of an illustrative embodiment of a wheel attachment arrangement in accordance with the principles of my invention.

In the drawing, wherein like numerals designate similar parts in the several figures, an illustrative embodiment of a new and novel wheel attachment arrangement in accordance with the principles of my invention is shown for demountably attaching wheel 10 to hub and axle assembly 20. Hub and axle assembly 20 typically includes, as shown in the drawing, a wheel mounting flange 21 and a brake drum enclosure 22. A plurality of lugs 30 are secured in and carried by wheel mounting flange 21 upon which wheel 10 is mounted for attachment to hub and axle assembly 20.

In the conventional bolt-on wheel attachment arrangement the lugs are threaded and the wheel, mounted on the lugs, is secured to the hub by lug nuts which are screwed down individually on each of the lugs against the wheel. In accordance with my invention the wheel hub assembly is substantially identical to that employed in bolt-on wheel attachment arrangements, except that the threaded lugs are replaced advantageously by non-threaded lugs 30. Moreover, wheel 10 may be advantageously of the inexpensive and readily available bolt-on type, the plurality of lug holes 11 therein engaging lugs 30 for mounting wheel 10 on hub and axle assembly 20 and for preventing unwanted rotationa movement of wheel 10 relative to hub and axle assembly 20.

As shown in the drawing, wheel 10 is securely and demountably attached to hub and axle assembly 20 in accordance with my invention through the use of a two-piece attachment assembly comprising lug disk 40 and disk bolt 60. Disk bolt 60 is in threaded engagement with a centrally located aperture 48 in lug disk 40 and is thus rotatable for axial movement thereof relative to lug disk 40. For the purposes of describing the invention it will be assumed that clockwise rotation of disk bolt 60 (in the direction indicated as ON in FIG. 2) moves disk bolt 60 into the drawing in FIG. 2, or toward the left relative to lug disk 40 in FIGS. 1 and 3. Conversely, counterclockwise rotation of disk bolt 60 (in the direction indicated as OFF in FIG. 2) will be assumed herein to move disk bolt 60 toward the right relative to lug disk 40 in FIGS. 1 and 3, or out of the drawing in FIG. 2.

Disk bolt 60 includes a flange 65 for bearing against wheel 10 in a face to face engagement therewith when wheel 10 and the wheel attachment assembly including disk bolt 60 are mounted on lugs 30. Disk bolt flange 65 further advantageously prevents removal of disk bolt 60 from aperture 48 in lug disk 40, thereby precluding separation and possible misplacement of disk bolt 60 from lug disk 40. The portion of disk bolt 60 facing hub and axle assembly 20 is shaped as required, such as indicated by way of example at 68 in the drawing, to clear any parts of hub and axle assembly 20 protruding through wheel 10. To facilitate rotation of disk bolt 60 in mounting and demounting wheel 10, the head thereof may be adapted to cooperate with a tool such as a wrench. By way of example, the head of disk bolt 60 is shown hexagonally shaped for this purpose in the illustrative embodiment of the drawing. Further, the head of disk bolt 60 may be provided with one or more ears 61 to permit operation of disk bolt 60 in the usual manner of knock-off wheel attachment arrangements, that is, rotation of disk bolt 60 is effected by hammering appropriately against one of disk bolt ears 61.

Lug disk 40 has disposed therein a plurality of apertures 41, each for selectively engaging a respective one of lugs 30 in such manner as to limit axial movement of lug disk 40 away from hub and axle assembly 20. In the illustrative embodiment of the invention shown in the drawing, apertures 41 are keyhole shaped for this purpose, the larger portion 42 thereof being of sufficient diameter to permit the free passage of lugs 30 therethrough for mounting wheel 10. When wheel 10 is initially mounted on lugs 30, therefore, each lug 30 passes through the larger portion 42 of a respective one of lug disk apertures 41. The smaller portion 43 of each lug disk aperture 41 is of suitable dimension relative to head 35 of lugs 30 so as to permit engagement of head 35 of lug 30 by smaller portion 43 of aperture 41 for limiting axial movement of lug disk 40 away from hub and axle assembly 20.

Figure 3:
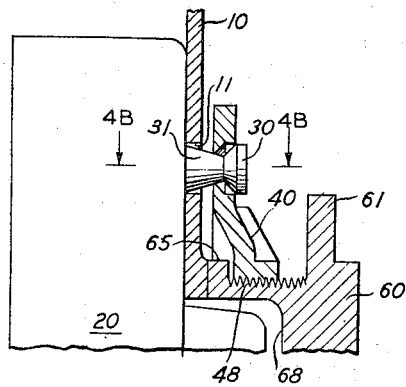
FIG. 3 is an enlarged sectional elevation of a portion of the illustrative embodiment of FIG. 1 depicting the relationship of the various components of the wheel attachment arrangement prior to securing the wheel to the hub and axle assembly.

In operation of my novel wheel attachment arrangement, wheel 10 is mounted on lugs 30 in the usual manner, lugs 30 passing through lug holes 11 of wheel 10. Lugs 30 may be tapered advantageously, as shown at 31 in the drawing, to facilitate centering wheel 10 on hub and axle assembly 20. The base of the tapered portion 31 of lug 30 protruding from hub and axle assembly 20 should provide a snug fit in lug holes 11 of wheel 10. Lug disk 40 is then mounted on lugs 30 next to wheel 10, individual ones of lugs 30 passing through larger portion 42 of respective ones of lug disk apertures 41. Flange 65 of disk bolt 60 is in face to face engagement with wheel 10. Slight rotation of lug disk 40 relative to wheel 10 and to hub and axle assembly 20, illustratively in the clockwise direction as shown in the drawing, engages the smaller portion 43 of each lug disk aperture under head 35 of respective ones of lugs 30 passing through apertures 41. This is the relationship of the various components of the wheel attachment arrangement, as depicted in FIG. 3, prior to securing wheel 10 to hub and axle assembly 20.

Figure 2:
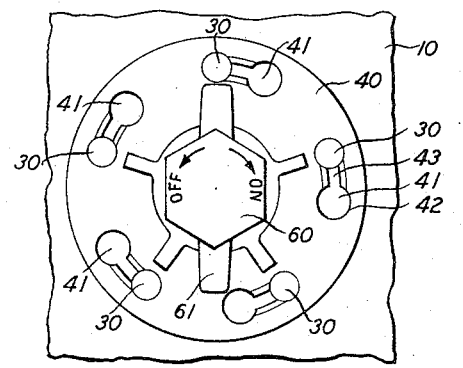
FIG. 2 is another elevation of a portion of the illustrative embodiment of FIG. 1.

Wheel 10 is shown securely attached to hub and axle assembly 20 in FIG. 1. This is accomplished quite simply in accordance with my wheel attachment arrangement by rotating disk bolt 60, illustratively in the clockwise direction, which advantageously is in the same direction as that in which lug disk 40 is rotated to bring lugs 30 into engagement with portion 43 of lug disk apertures 41. Rotation of disk bolt 60 in the direction indicated, flange 65 thereof being in face to face engagement with wheel 10, urges wheel 10 firmly against hub and axle assembly 20 and urges lug disk 40 away from wheel 10. Lug disk 40 is limited in its movement away from wheel 10 by lugs 30 engaging lug disk apertures 41 in the manner aforementioned. Thus disk bolt 60 functions as a threaded wedge between wheel 10 and lug disk 40, rotation of disk bolt 60 firmly and securely attaching wheel 10 to hub and axle assembly 20.

The underside 34 of heads 35 of lugs 30 and the corresponding surface 44 of smaller portion 43 of apertures 41 may be tapered or beveled advantageously, as shown in the drawing, to facilitate centering lug disk 40 on hub and axle assembly 20. Frictional contact of lugs 30 with the edges of apertures 41 during rotation of lug disk 40 relative to hub and axle assembly 20 is also thereby minimized. Moreover, beveling underside 34 of lug heads 35 prevents catching larger portion 42 of lug disk apertures 41 under heads 35 and thus facilitates removal of lug disk 40 from lugs 30.

Figure 4B:
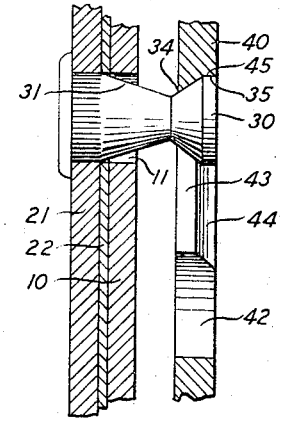
FIGS. 4A and 4B are enlarged elevations of a portion of the embodiment of FIG. 1 showing the illustrative lug and lug disk aperture construction.
Figure 4A:
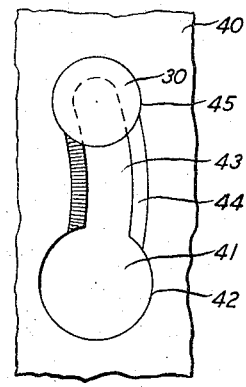

When disk bolt 60 is screwed down firmly against wheel 10, the pressure exerted thereby upon the engaging surfaces of lugs 30 and lug disk apertures 41 is sufficient to prevent rotation of lug disk 40 relative to hub and axle asesmbly 20 in normal vehicle operation. In accordance with another aspect of my invention, rotation of lug disk 40 relative to hub and axle assembly 20 is further prevented by individual detents 45 in smaller portion 43 of each of lug disk apertures 41. When lug disk 40 is secured to hub and axle assembly 20 by operation of disk bolt 60 in the above-described manner, heads 35 of lugs 30 are engaged in detents 45 of lug disk apertures 41, as shown in FIGS. 1 and 4B.

Removal of wheel 10 is readily accomplished by reversing the above steps. Disk bolt 60 is rotated in a direction opposite to that for attaching wheel 10, illustratively in the counterclockwise direction, until lug disk 40 is loosened sufficiently to permit lugs 30 to be disengaged from smaller portion 43 of lug disk apertures 41. Lug disk 40 is then rotated slightly to bring lugs 30 within the larger portion 42 of lug disk apertures 41, thereby permitting removal of lug disk 40 from lugs 30, and thus wheel 10 from hub and axle assembly 20.

Although the illustrative embodiment of the invention shown in the drawing depicts specific arrangements, such as for the lugs and lug disk apertures, it will be apparent from the description above that other arrangements may be readily employed for selectively engaging a hub and axle assembly, and for utilizing such engagement in combination with a threaded wedge for securing a wheel to the hub and axle assembly. It is to be understood, therefore, that the above-described arrangements are but illustrative of the application of the principles of my invention. Numerous other arrangements may be devised by those skilled in the art without departing from the spirit and scope of the invention.

What is claimed is:

1. An arrangement for demountably attaching a wheel to a hub and axle assembly comprising, mounting apparatus including a plurality of lugs secured to said hub and axle assembly, each said lug having a head and a stem tapering toward said head for centering said wheel relative to said hub and axle assembly, said wheel having a plurality of apertures therein for individually receiving respective ones of said lugs, a portion of each of said lugs including said lug heads protruding through said wheel apertures when said wheel is mounted on said hub and axle assembly, a first device operable to engage the protruding heads of each of said lugs in such manner as to restrain movement of said first device in an axial direction away from said hub and axle assembly, the under side of said protruding lug heads and the engaging surfaces of said first device being beveled to facilitate centering said engaged first device on said lugs, and a second device operable to provide a wedge between said mounted wheel and said engaged first device, said second device being in threaded engagement with a centrally located aperture in said first device for permitting rotational movement of said second device relative to said first device, rotational movement of said second device in a predetermined direction relative to said engaged first device providing said wedge between said engaged first device and said mounted wheel, and said first device including tapered indented recesses for engaging said lug heads to prevent said first device from disengaging said lugs when said second device is operated.

2. An arrangement for demountably attaching a wheel having a plurality of apertures therein to a hub and axle assembly comprising, a plurality of lugs secured to said hub and axle assembly and each including a head and stem tapering toward said head to facilitate centering said wheel on said lugs, the individual wheel apertures receiving individual ones of said lugs when said wheel is mounted on said hub and axle assembly, a first device operable for engaging said lugs when said wheel is mounted on said hub and axle assembly in such manner as to sandwich said wheel between said first device and said hub and axle assembly, said first device having a plurality of keyhole apertures and a single threaded aperture, said lug heads adapted to pass freely through the larger portion of said keyhole apertures and to engage the smaller portion of said keyhole apertures upon movement of said first device in a particular direction relative to said hub and axle assembly, said smaller portion of said keyhole apertures and the under portion of said lug heads engaged thereby having complimentary tapered surfaces, a second device in threaded engagement with said single threaded aperture and having a flange arranged for face to face engagement with said mounted wheel when said first device engages said lugs, said second device being rotatable relative to said first device to provide a wedge between said mounted wheel and said first device when said first device is operated to engage said lugs, and indented recess means in the smaller portion of each of said keyhole apertures shaped so as to intimately engage the under portion of said lug heads when said second device is rotated to provide said wedge between said mounted wheel and said first device, thereby preventing disengagement of said first device from said lugs.

References Cited

UNITED STATES PATENTS

| | | | |
|---|---|---|---|
| 2,077,567 | 4/1937 | Orr | 301—9 |
| 2,244,083 | 6/1941 | Richter | 301—9 |
| 2,628,132 | 2/1953 | Trapp | 301—9 |
| 2,632,675 | 3/1953 | Richard | 301—9 |

FOREIGN PATENTS

| | | |
|---|---|---|
| 189,945 | 5/1957 | Austria. |
| 560,053 | 6/1923 | France. |
| 474,649 | 9/1952 | Italy. |

RICHARD J. JOHNSON, *Primary Examiner.*